United States Patent
Fitzpatrick et al.

(10) Patent No.: US 10,794,204 B2
(45) Date of Patent: Oct. 6, 2020

(54) ADVANCED STATIONARY SEALING CONCEPTS FOR AXIAL RETENTION OF CERAMIC MATRIX COMPOSITE SHROUDS

(71) Applicant: General Electric Company, Schenectady, NY (US)

(72) Inventors: Dylan James Fitzpatrick, Peabody, MA (US); David Scott Stapleton, Boston, MA (US); Jonathan David Baldiga, Amesbury, MA (US); Christopher Paul Tura, Nahant, MA (US)

(73) Assignee: General Electric Company, Schenectady, NY (US)

( * ) Notice: Subject to any disclaimer, the term of this patent is extended or adjusted under 35 U.S.C. 154(b) by 1050 days.

(21) Appl. No.: 14/867,137

(22) Filed: Sep. 28, 2015

(65) Prior Publication Data

US 2017/0089212 A1    Mar. 30, 2017

(51) Int. Cl.
*F01D 11/00* (2006.01)
*F16J 15/08* (2006.01)
*F16J 15/02* (2006.01)

(52) U.S. Cl.
CPC ........... *F01D 11/005* (2013.01); *F16J 15/027* (2013.01); *F16J 15/0893* (2013.01);
(Continued)

(58) Field of Classification Search
CPC ...... F01D 11/005; F01D 11/08; F01D 11/001; F01D 25/246; F01D 25/12; F01D 25/145;
(Continued)

(56) References Cited

U.S. PATENT DOCUMENTS 4,589,666 A * 5/1986 Halling ................. F16L 51/025
  277/631
7,152,864 B2  12/2006 Amos et al.
(Continued)

FOREIGN PATENT DOCUMENTS

CN    100390389 C    5/2008
WO    03014530 A1    2/2003
(Continued)

OTHER PUBLICATIONS

European Search Report and Opinion issued in connection with corresponding EP Application No. 16190927.0 dated Feb. 9, 2017.
(Continued)

Primary Examiner — Mark A Laurenzi
Assistant Examiner — Loren C Edwards
(74) Attorney, Agent, or Firm — Dority & Manning, P.A.

(57) ABSTRACT

In one aspect, the present disclosure is directed to a gas turbine sealing assembly that includes a first static gas turbine wall and a second static gas turbine wall. A seal is disposed between the first static gas turbine wall and the second static gas turbine wall. The seal includes a shield wall constructed from a first material that includes a first shield wall portion and a second shield wall portion. A spring constructed from a second material includes a first spring portion and a second spring portion. The first shield wall portion is adjacent to the first spring portion, and the second shield wall portion is adjacent to the second spring portion.

19 Claims, 6 Drawing Sheets

(52) U.S. Cl.
CPC .... *F05D 2240/55* (2013.01); *F05D 2300/502* (2013.01); *Y02T 50/672* (2013.01)

(58) Field of Classification Search
CPC . F01D 9/042; F16J 15/027; F16J 15/00; F16J 15/0893; F05D 2240/55; F05D 2300/502; F02C 7/24; Y02T 50/672
USPC .......................................................... 60/805
See application file for complete search history.

(56) References Cited

U.S. PATENT DOCUMENTS

| | | | |
|---|---|---|---|
| 2005/0073114 A1* | 4/2005 | Amos | F01D 11/005 277/644 |
| 2009/0074565 A1* | 3/2009 | Suciu | F02C 3/113 415/122.1 |
| 2012/0171027 A1* | 7/2012 | Albers | F01D 11/005 415/208.1 |
| 2015/0076770 A1* | 3/2015 | Parker | F16J 15/064 277/590 |

FOREIGN PATENT DOCUMENTS

| | | |
|---|---|---|
| WO | 2005033558 A1 | 4/2005 |
| WO | 2015041897 A1 | 3/2015 |
| WO | 2015076889 A1 | 5/2015 |
| WO | 2015112662 A1 | 7/2015 |

OTHER PUBLICATIONS

Canadian Office Action Corresponding to Application No. 2941837 dated Jun. 5, 2017.
Chinese Office Action Corresponding to Application No. 201610857487.4 dated Jan. 29, 2019.

* cited by examiner

ADVANCED STATIONARY SEALING CONCEPTS FOR AXIAL RETENTION OF CERAMIC MATRIX COMPOSITE SHROUDS

FIELD OF THE INVENTION

The present subject matter relates generally to a sealing assembly for a gas turbine engine. More particularly, the present subject matter relates to a sealing assembly for adjacent stationary components of a gas turbine engine having retention bosses for removably components constructed from different materials.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP turbine and the LP turbine each include various stationary turbine components (e.g., stator vanes or nozzles, turbine shrouds, shroud supports, etc.) that at least partially define the hot gas path through the turbine section. These stationary components are typically constructed from materials capable of withstanding prolonged exposure to the hot gasses (e.g., ceramic matrix composite). Nevertheless, the stationary components positioned radially outward from the hot gas path (e.g., casing) may have less favorable thermal properties. In this respect, seals may be disposed between adjacent stationary components along the hot gas path to prevent hot exhaust gases from flowing therebetween.

Conventional sealing arrangements may limit the temperatures of the hot gasses flowing through the turbine section, thereby hindering the efficiency of the gas turbine engine. Accordingly, a sealing assembly for sealing adjacent stationary components in a gas turbine engine including retention bosses for removably coupling components constructed from different materials, wherein one of the materials is capable of withstanding increased exhaust gas temperatures, would be welcomed in the technology. Such a sealing assembly would permit the gas turbine engine to burn hotter, thereby improving specific fuel consumption.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a gas turbine sealing assembly that includes a first static gas turbine wall and a second static gas turbine wall. A seal is disposed between the first static gas turbine wall and the second static gas turbine wall. The seal includes a shield wall constructed from a first material that includes a first shield wall portion and a second shield wall portion. A spring constructed from a second material includes a first spring portion and a second spring portion. The first shield wall portion is adjacent to the first spring portion, and the second shield wall portion is adjacent to the second spring portion.

Another aspect of the present disclosure is directed to a gas turbine. The gas turbine includes a compressor, a combustion section, a turbine section having a turbine shroud mount and a stator vane mount. A seal is disposed between the turbine shroud mount and the stator vane mount. The seal includes a shield wall constructed from a first material. The shield wall includes a first shield wall portion and a second shield wall portion. A spring constructed from a second material includes a first spring portion and a second spring portion integrally connected by at least three convolutions. The first shield wall portion is adjacent to the first spring portion, and the second shield wall portion is adjacent to the second spring portion.

In a further aspect, the present disclosure is directed to a gas turbine sealing assembly including a turbine shroud mount and a stator vane mount. A seal is disposed between the turbine shroud mount and the stator vane mount. The seal includes a shield wall constructed from a first material. The shield wall includes a first shield wall portion and a second shield wall portion integrally connected by a convolution. A spring constructed from a second material includes a first spring portion and a second spring portion integrally connected by at least three convolutions. The first shield wall portion is axially inward from the first spring portion, and the second shield wall portion is axially inward from the second spring portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
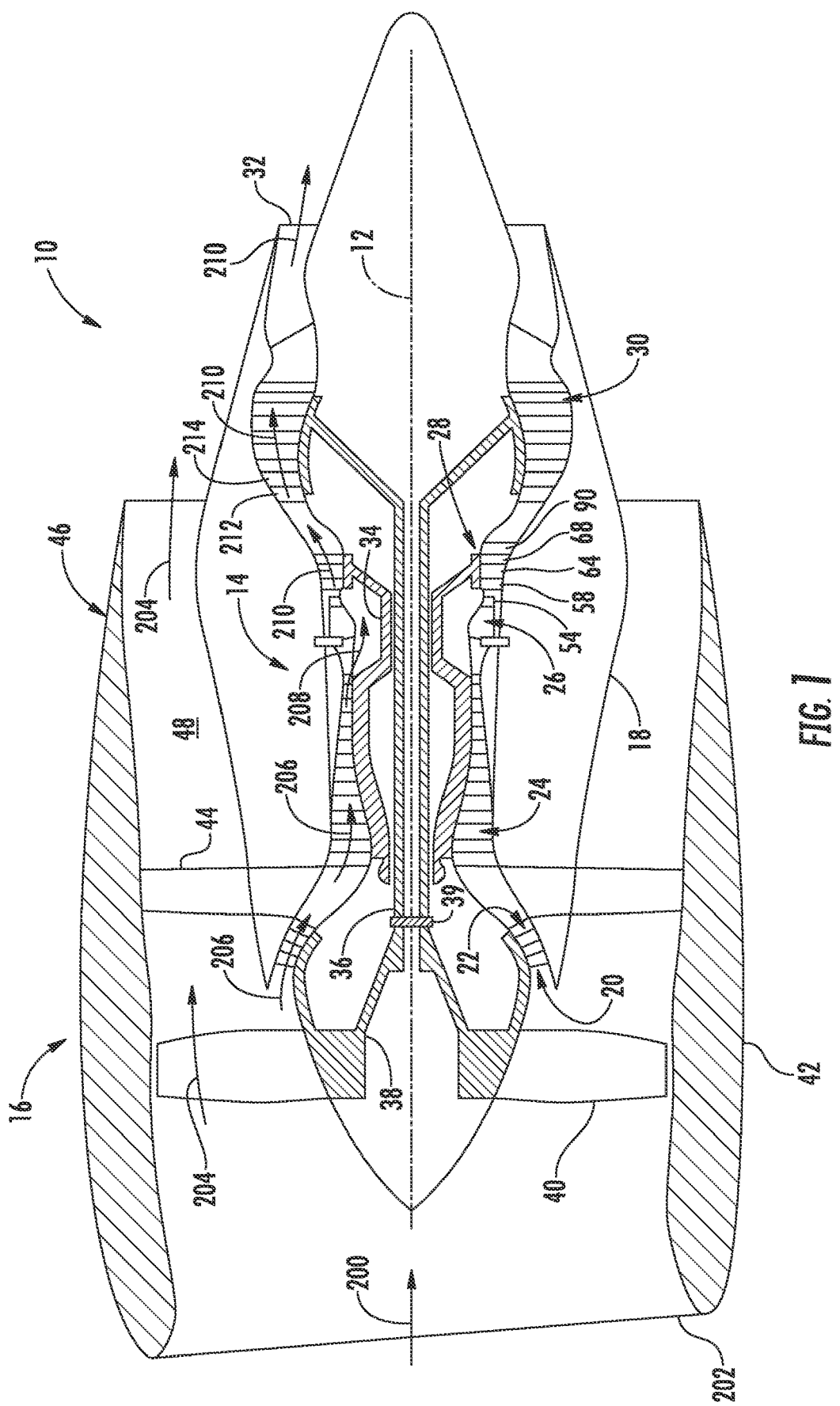
FIG. 1 is a schematic cross-sectional view of an exemplary high bypass turbofan jet engine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" as may incorporate various embodiments of the present invention. As shown in FIG. 1, the turbofan 10 includes a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 may encase, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. The nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
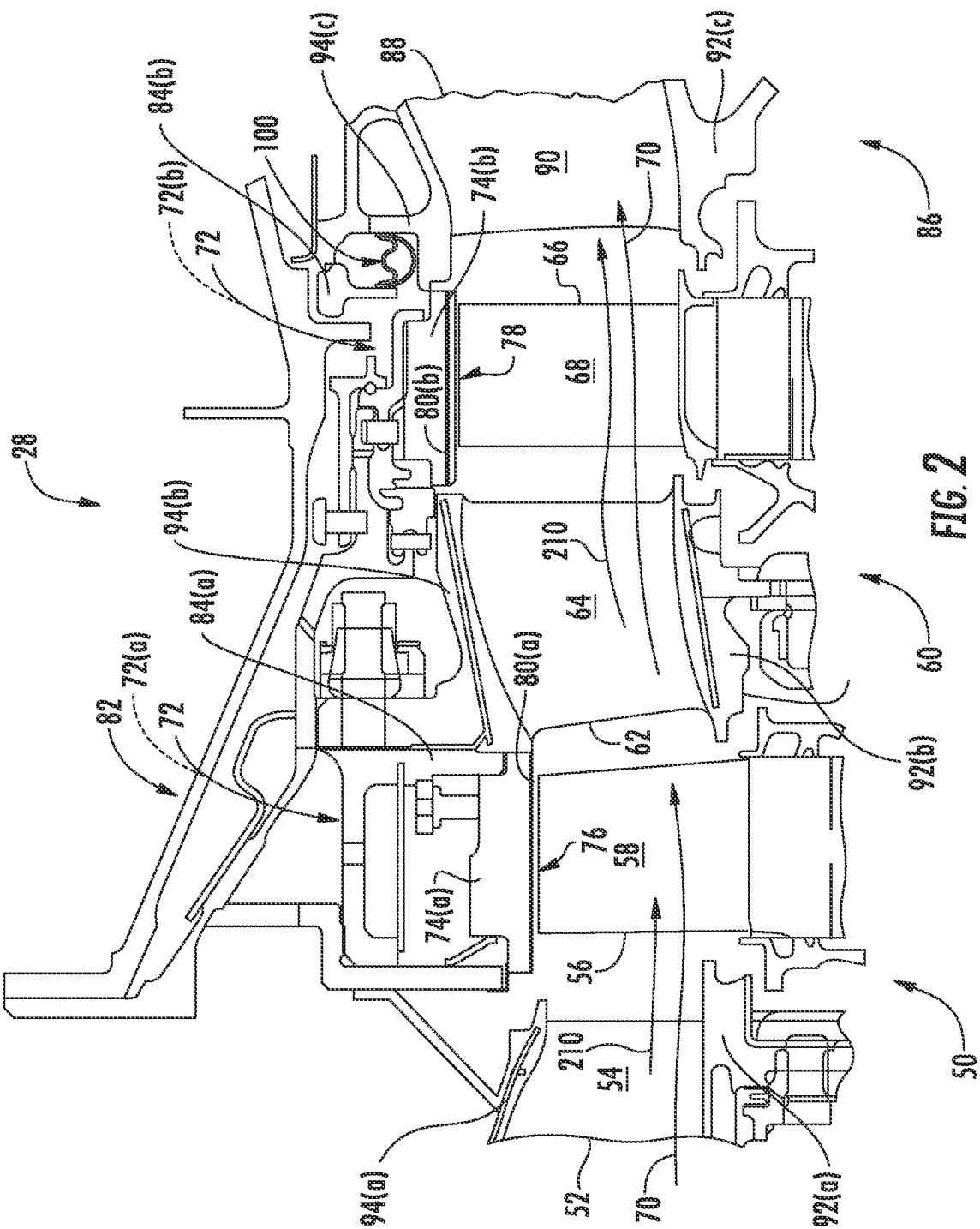
FIG. 2 is an enlarged cross sectional side view of a high pressure (HP) turbine portion of the gas turbine engine shown in FIG. 1, illustrating the location of a sealing assembly therein.

FIG. 2 is an enlarged cross-sectional view of the HP turbine 28 portion of the gas turbine engine 14 shown in FIG. 1, which may incorporate various embodiments disclosed herein. As shown in FIG. 2, the HP turbine 28 may include, in serial flow relationship, a first stage 50 having a row 52 of one or more stator vanes 54 (only one shown) axially spaced apart from a row 56 of one or more turbine rotor blades 58 (only one shown). The HP turbine 28 may further include a second stage 60 having a row 62 of one or more stator vanes 64 (only one shown) axially spaced apart from a row 66 of one or more turbine rotor blades 68 (only one shown). The HP turbine 28 may include a third stage 86 having a row 88 of one or more stator vanes 90 (only one shown). Although not shown in FIG. 2, the third stage 86 may also include a row of turbine rotor blades.

The turbine rotor blades 58, 68 extend radially outwardly from and are coupled to the HP spool 34 (FIG. 1). As shown in FIG. 2, the stator vanes 54, 64, 90 and the turbine rotor blades 58, 68 at least partially define a hot gas path 70 for routing combustion gases from the combustion section 26 (FIG. 1) through the HP turbine 28. As shown in FIG. 1, the rows 52, 62, 88 of the stator vanes 54, 64, 90 are annularly arranged about the HP spool 34 and the rows 56, 66 of the turbine rotor blades 58, 68 are circumferentially spaced around the HP spool 34. The stator vanes 54, 64, 90 respectively mount to the HP turbine 28 via a radially inner stator vane mount 92a, 92b, 92c and a radially outer stator vane mount 94a, 94b, 94c or any other suitable hardware components.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68. Each turbine shroud assembly 72(a), 72(b) includes a turbine shroud or shroud seal 74(a), 74(b) radially spaced from blade tips 76, 78 of the turbine rotor blades 58, 68. This arrangement forms clearance gaps between the blade tips 76, 78 and sealing surfaces or hot side surfaces 80(a), 80(b). It is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps.

In particular embodiments, at least one of the turbine shrouds 74(a), 74(b) may be formed as a continuous, unitary or seamless ring. Each turbine shroud assembly 72(a), 72(b) may be connected to a static structure such as a backbone or casing 82 of the gas turbine engine 14 via a shroud ring assembly mount 84(a), 84(b) or other suitable hardware components.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64, 90 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and kinetic energy from the combustion gases 210. This energy extraction causes the LP shaft or spool 36 to rotate, thereby supporting operation of the LP compressor 22 and/or the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

The temperature of the combustion gases 210 flowing through the HP and LP turbine sections 28, 30, and particularly through the HP turbine 28, may be extreme. For example, the combustion gases 210 flowing through the hot gas path 70 defined by/within the HP turbine 28 may exceed 2000 degrees Fahrenheit. In this respect, the components disposed along the hot gas path 70 (e.g., stator vanes 54, 64, 90; turbine rotor vanes 58, 68; turbine shroud assemblies 72a, 72b; etc.) are typically constructed from a metal, a ceramic matrix composite (CMC), or any other material capable of withstanding prolonged exposure to the hot gasses.

Nevertheless, the components positioned radially outward from the hot gas path 70 (e.g., the casing 82) may have less favorable thermal properties. In this respect, a sealing assembly 100 may be disposed between adjacent stationary components along the hot gas path 70 to prevent hot exhaust gases from flowing therebetween. In the embodiment shown in FIG. 2, for example, the sealing assembly 100 is positioned between the shroud assembly mount 84(b) and the radially inner stator vane mount 94. Although, the sealing assembly 100 may be disposed between any adjacent stationary components in the low HP turbine 28, the LP turbine 30, or anywhere else in the gas turbine engine 10. The sealing assembly 100 preferably extends annularly around the entire circumference of the HP turbine 28 or LP turbine 30.

Figure 3:
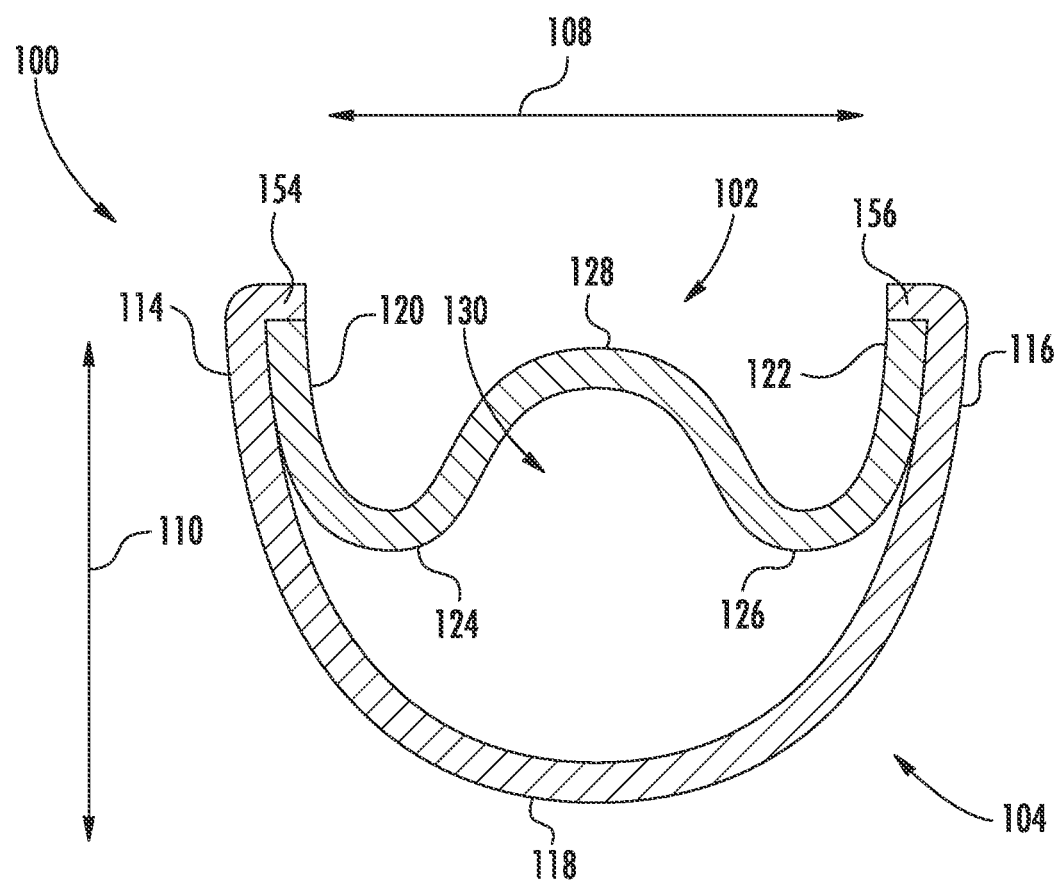
FIG. 3 is a cross-sectional view of one embodiment of the sealing assembly in FIG. 2, illustrating a spring positioned axially inward from a shield wall.
Figure 4:
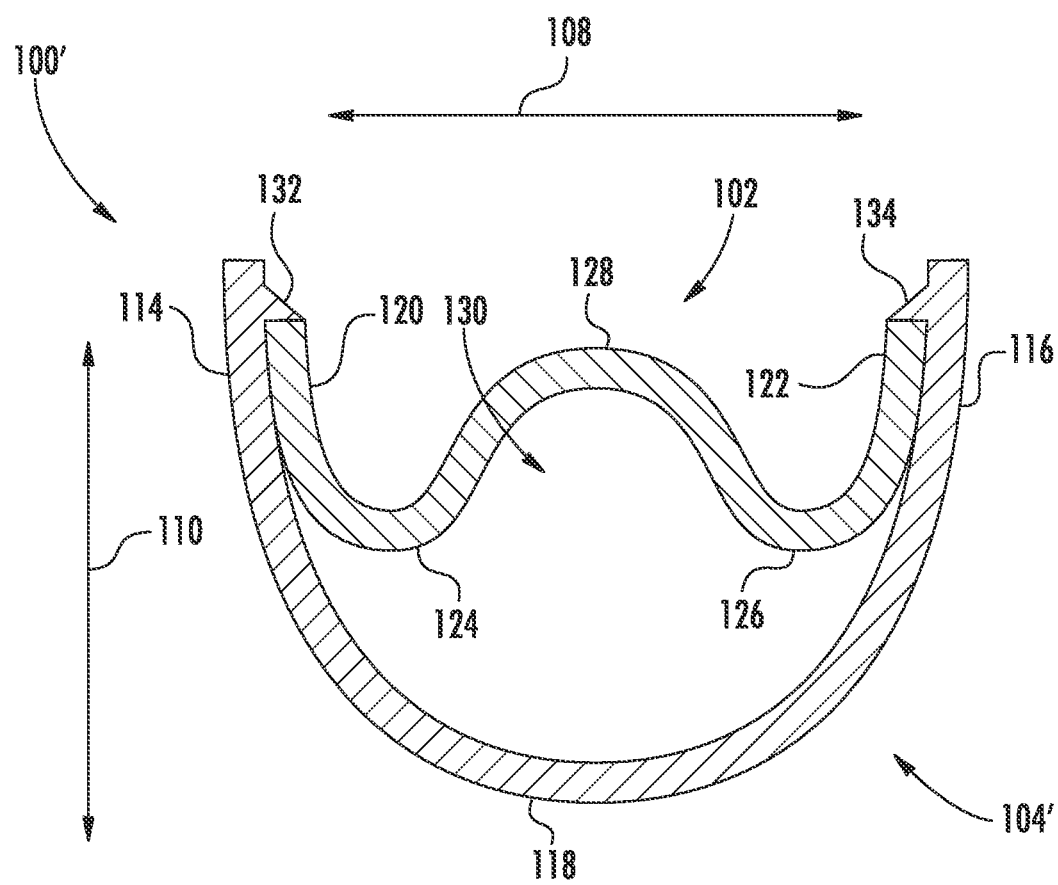
FIG. 4 is an enlarged cross-sectional view of an alternate embodiment of the sealing assembly, illustrating two retention bosses for coupling the spring and the shield wall.
Figure 5:
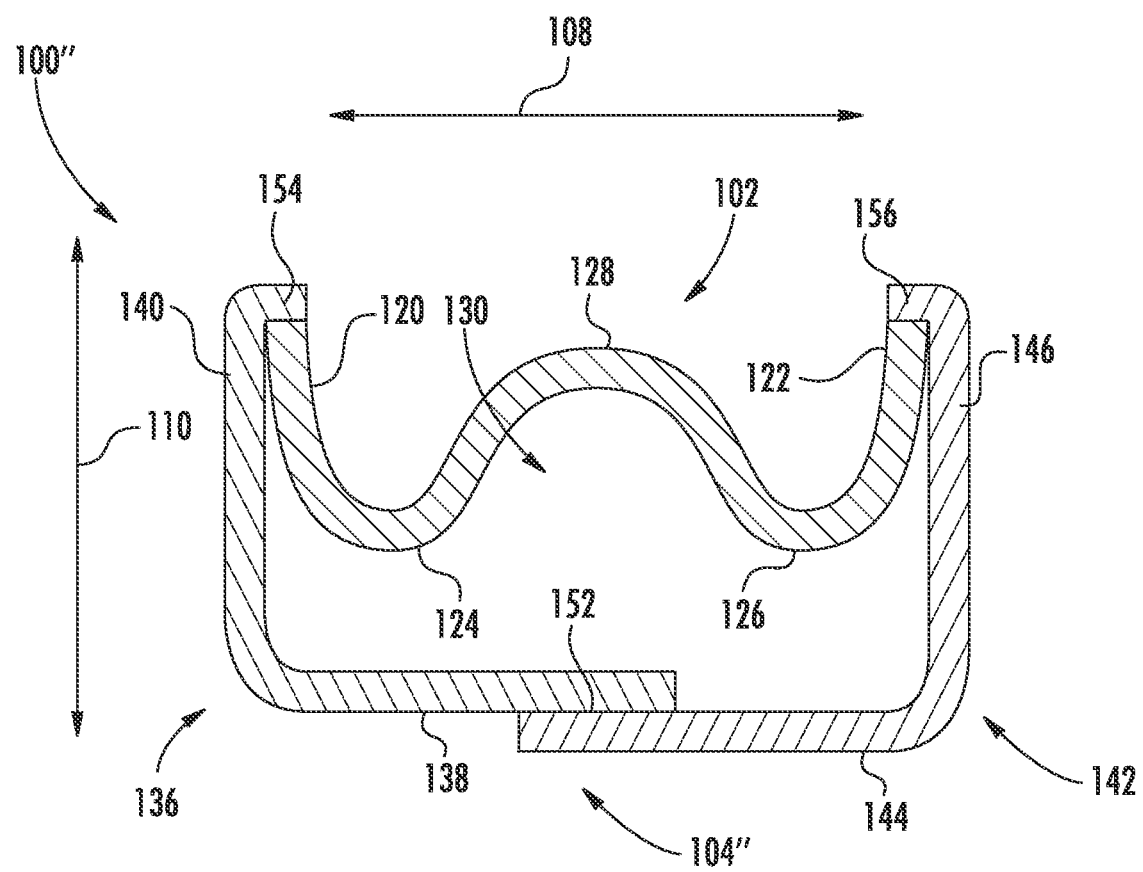
FIG. 5 is a cross-sectional view of a further alternate embodiment of the sealing assembly in FIG. 2, illustrating the shield wall formed from two generally L-shaped walls.
Figure 6:
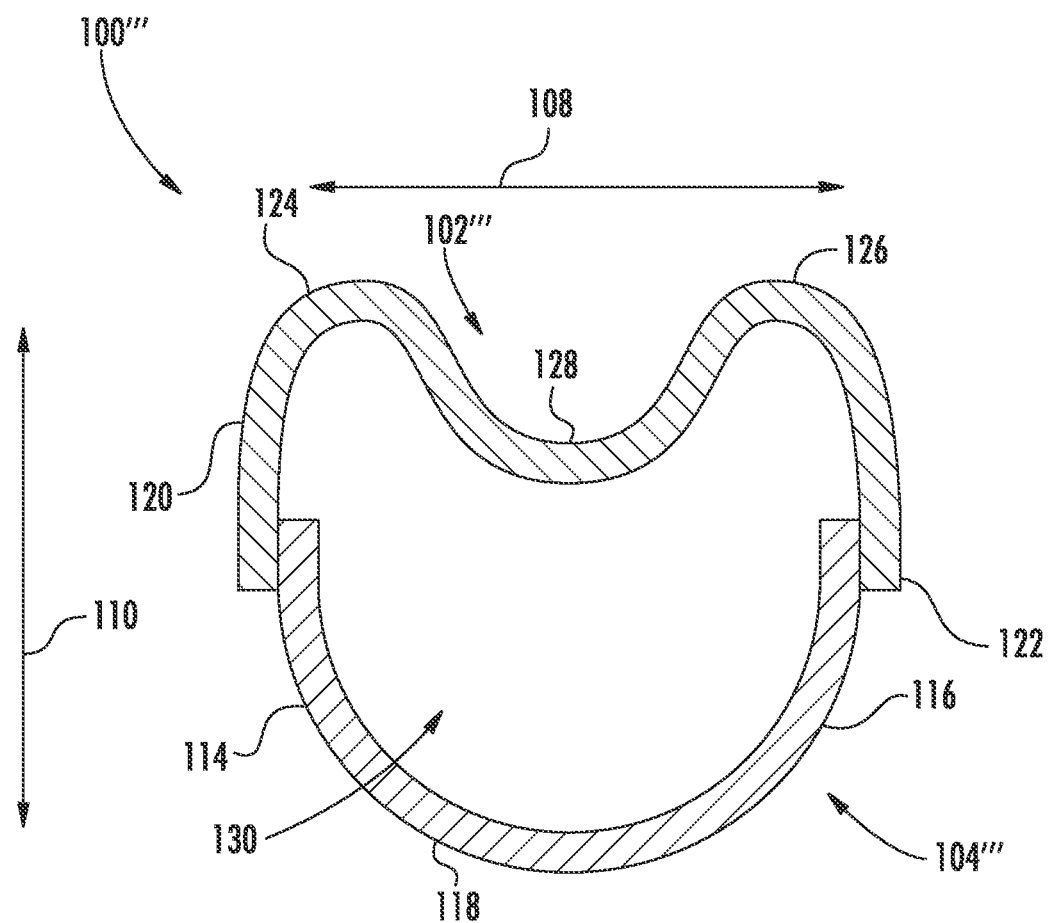
FIG. 6 is a cross-sectional view of yet another alternate embodiment of the sealing assembly in FIG. 2, illustrating the shield wall positioned axially inward from the spring.

FIGS. 3-6 illustrate various embodiments of a sealing assembly 100. More specifically, FIG. 3 is an enlarged cross-sectional view of the sealing assembly 100 shown in FIG. 2, illustrating a spring 102 positioned axially inward of and secured to a shield wall 104. FIG. 4 is an enlarged cross-sectional view of an alternate embodiment of the sealing assembly 100', illustrating two retention bosses 132, 134. FIG. 5 is an enlarged cross-sectional view of another alternate embodiment of the sealing assembly 100", illustrating two generally L-shaped walls 136, 142 forming the shield wall 104". FIG. 6 is an enlarged cross-sectional view of a further alternate embodiment of the sealing assembly 100''', illustrating the shield wall 104''' positioned axially inward of and secured to the spring 102'''.

As illustrated in FIGS. 3-6, the sealing assembly 100 defines axial direction identified by an arrow 108 and a radial direction identified by an arrow 110. In general, the axial direction extends along the longitudinal axis 12, and the radial direction extends orthogonally outward from the longitudinal axis 12.

With respect to FIG. 3, the sealing assembly 100 may include the shield wall 104 having a first shield wall portion 114 axially spaced apart from a second shield wall portion 116. Each shield wall portion 114, 116 preferably has the same length, but may have different lengths as well. A curved shield wall portion or convolution 118 may connect the first shield wall portion 114 to the second shield wall portion 116. In this respect, the shield wall 104 is may be generally U-shaped. Alternately, a pair of adjacent convolutions, a pair of convolutions separated by a generally straight wall portion (not shown), or a straight wall portion without convolutions may connect the first and the second shield wall portions 114, 116. In a further embodiment, the first and the second shield wall portions 114, 116 may connect directly to one another, thereby forming a V-shape. The various components of the shield wall (i.e., the first and second shield wall portions 114, 116; the shield wall convolution 118; etc.) may be integrally connected or formed as separate components and permanently connected by, e.g., welding.

The sealing assembly 100 may include the spring 102 having a first spring portion 120 axially spaced apart from a second spring portion 122. The spring portions 120, 122 preferably have the same length, but may also have different lengths. At least one curved spring portion or convolution connects the first spring portion 120 and the second spring portion 122. For example, FIG. 3 illustrates three convolutions 124, 126, 128 connecting the first and second spring portions 120, 122, thereby giving the seal 102 a generally W-shape. More specifically, a first axially outward convolution 124 connects to the first spring portion 120, and a second axially outward convolution 126 connects to the second spring portion 122. A center convolution 128 connects the first and second axially outward convolutions 124, 126. The first and second axially outward convolutions 124, 126 are referred to as axially outward convolution because each is position axially outward from the center convolution 128. In this respect, the center of the center convolution 128 defines a center point of the axial direction. As illustrated in FIG. 3, the first and second axially outer convolutions 124, 126 are concave and the center convolution is convex. In this respect, the convolutions 124, 126, 128 are axially spaced apart. In alternate embodiments, the spring 102 may have more or less concave and/or convex convolutions. Each convolution 124, 126, 128 preferably has the same radius and/or arc length, but may also have different radii and/or arc lengths. In a further embodiment, the first and the second seal portions 120, 122 may connect directly to one another, thereby forming a V-shape. In yet another embodiment, the first and second seal portions 120, 122 may be connected with an inverted V-member (not shown) or a flat horizontal member (not shown). The various components of the spring 102 (i.e., the first and second spring portions 120, 122; the convolutions 124, 126, 128; etc.) may be integrally connected or formed as separate components and permanently connected by, e.g., welding.

When the seal assembly 100 is assembled as illustrated in FIG. 3, the shield wall 104 axially encloses the spring 102. That is, the spring 102 fits in between the first and second shield wall portions 114, 116. In this respect, the shield wall 104 encloses a portion of the spring 102, e.g., approximately 180 degrees of the spring 102. Although, the shield wall 104 may enclose more or less of the spring 102.

During assembly, the spring 102 is placed axially within the first and the second side walls 114, 116. As such, the first and the second spring portions 120, 122 contact the first and the second side walls 114, 116. The ends of the first and the second side walls 114, 116 are bent so that they curl over the ends of the first and the second spring portions 120, 122 as illustrated in FIG. 3. In this respect, the ends of the first side wall 114 forms a first crimp 154, and the end of the first side wall 114 forms a second crimp 156. The crimps 154, 156 may be bent backwards (i.e., so that the crimps 154, 156 do not curl over the ends of the first and the second spring portions 120, 122) to remove the spring 102 from the shield wall 104.

After assembly, the crimps 154, 156 permit axial and radially inward movement of the spring 102. But, the crimps 154, 156 circumscribe the radially outward-most position that the spring 102 may move relative to the shield wall 104. In this respect, the first spring portion 120 is adjacent to and in sliding contact with the first shield wall portion 114, and the second spring portion 122 is adjacent to and in sliding contact with the second shield wall portion 116. Accordingly, the shield member 104 should be axially and radially longer than the spring 102.

The sealing assembly 100 is positioned in sealing engagement with the adjacent stationary gas turbine components (e.g., the shroud assembly mounts 84(*a*), 84(*b*); the stator vane radially outer mounts 94(*a*), 94(*b*), 94(*c*); etc.). In this respect, the sealing assembly 100 prevents the exhaust gases from contacting stationary gas turbine components radially outward from the hot gas path 70 (e.g., the casing 82).

When assembled, the spring 102 and the shield wall 104 define a compartment 130 therebetween. This compartment may be pressurized with, e.g., pressurized air to increase the axially outward force that shield wall portions 114, 116 exert on the adjacent stationary turbine components. This, in turn, creates a tighter and stronger seal. Although, the compartment 130 may not be pressurized.

The shield wall 104 is constructed from a first material, and the spring 102 is constructed from a second material. The first material has a relatively greater temperature tolerance than the second material. Temperature tolerance means at least the ability maintain structural integrity and rigidity at high temperatures. In this respect, a material with a relatively greater temperature tolerance is able to maintain its structural integrity and rigidity at relatively higher temperatures than a material with a relatively lower temperature tolerance. As such, the shield wall 104 is able to withstand relatively higher temperatures than the spring 102. The second material may have a relatively greater creep resistance than the first material at the operating temperature. In this respect, the spring 102 is more resilient and is able to maintain its load bearing capability better than the shield wall 104. The first and second materials are preferably metals. In one embodiment, the first material is preferably a cobalt alloy and more preferably a cobalt-nickel-chromium-tungsten-based alloy (e.g., Haynes® 188 Alloy produced by Haynes International of Kokomo, Ind., USA) and the second material is a nickel-based high temperature alloy (e.g., Rene 41 Alloy produced by General Electric Co. of Schenectady, N.Y., USA).

As illustrated in FIG. 2, the sealing assembly 100 seals between two adjacent stationary components, such as one of the stator vane assembly mounts 94(*a*), 94(*b*), 94(*c*) and one of the turbine shroud radially outer mounts 84(*a*), 84(*b*). The relatively greater temperature tolerance of the first material permits the shield wall 104 to withstand higher combustion gas temperatures. As such, the sealing assembly 100 is positioned in the turbofan 10 so that the shield wall 104 is radially inward from the spring 102 to protect the spring 102 from exposure to the combustion gasses 210. The relatively greater creep resistance of the second material permits the spring 102 to maintain the axially outward force that provides the sealing between the adjacent stationary components. In this respect, the use of a first material and different a second material permits the seal assembly 100 to provide sealing at greater temperatures than conventional seals. Furthermore, the crimps 154, 156 allow removable attachment of the shield wall 104 to the spring 102, while still permitting the spring 102 to move radially relative to the shield wall 104.

FIG. 4 illustrates an alternate embodiment of the sealing assembly 100', which uses a first retention boss 132 and a second retention boss 134 instead of the crimps 154, 156 to secure the spring 102 and the shield wall 104. More specifically, a shield wall 104' may include the first retention boss 132 extending axially inward from the axially inward side of the first shield wall portion 114. The second retention boss 134 extends axially inward from the axially inward side of the second shield wall portion 116. As such, the retention bosses 132, 134 face one another. The retention bosses 132, 134 may be integrally formed with the shield wall 104'. The retention bosses 132, 134 may extend for the entire width of the first and second shield wall portions 114, 116 or for only a portion thereof. The retention bosses 132, 134 may have a triangular cross-sectional shape. As illustrated in FIG. 4, the axially-most inward portion of the triangular retention bosses 132, 134 may also be the radially-most inward portion thereof as well. Although, the retention bosses 132, 134 may have any suitable cross-sectional shape (e.g., rectangular, hemispherical, etc.). The sealing assembly 100' is otherwise similar to the sealing assembly 100.

The first and second retention bosses 132, 134 removeably attach the spring 102 and shield wall 104'. During assembly, the first and second spring portions 120, 122 slide radially inward past the retention bosses 132, 134 and along the shield wall portions 114, 116 until the radially outwardmost ends of the first and second spring portions 120, 122 slide past the retention bosses 132, 134. The first and second spring portions 120, 122 flex axially inward and/or the first and second shield wall portions 114, 116 flex axially outward when the first and second spring portions 120, 122 slide along the retention bosses 132, 134.

FIG. 5 illustrates an alternate embodiment of the sealing assembly 100", which includes an alternate shield wall 104". The shield wall 104" includes a first shield wall member 136 having a first radial wall 138 and a first axial wall 140. The shield wall 104" further includes a second shield wall member 142 having a second radial wall 144 and a second axial wall 146. The first and second radial walls 138, 144 are referred to as radial walls because each is in a radial plane orthogonal to the radial direction. Similarly, the first and second axial walls 140, 146 are referred to as axial walls because each is in an axial plane orthogonal to the axial direction. The axial and radial walls 138, 140, 144, 146 are preferably perpendicular to one another, but have any other suitable orientation. The axial walls 140, 146 generally correspond to the first and second shield wall portions 114, 116 in the shield wall 104. The sealing assembly 100" also includes the spring 102 discussed above.

The seal assembly 100" assembles in a similar manner as the seal assembly 100 (i.e., with the crimps 154, 156). Once the seal assembly 100" is installed in the turbofan 10, the axially outward force exerted by the spring 102 pushes the shield wall members 136, 142 into sealing contact with the stationary gas turbine components, thereby holding the seal assembly 100" in place in at least the radial direction. The first radial wall 138 sliding engages the second radial wall 144 along a mating surface 152. In this respect, the radial walls 138, 144 slide toward and away from one another (i.e., axial inward and outward) in response to thermal expansion the seal assembly 100". Friction minimizes, but does not prevent, radial movement between the spring 102''' and the shield wall 104'''. Permanently attaching any of the components of the seal assembly 100" together or to the stationary gas turbine components is unnecessary.

FIG. 6 illustrates a further alternate embodiment of the sealing assembly 100''' in which the first and second shield wall portions 114, 116 are positioned axially inward of the first and second spring portions 120, 122. In this respect, the sealing assembly 100''' includes an alternate spring 102''' having a generally W-shape similar to the spring 102 and an alternate shield portion 104''' having a generally U-shape similar to the shield wall 104. In this respect, the spring 102''' includes the first and the second spring portions 120, 122, and the shield wall 104''' includes the first and the second shield wall portions 114, 116. Unlike in the sealing assembly 100, however, the spring 102''' is axially longer than the shield wall 104" to axially enclose the shield wall 104'''.

The shield wall 104''' is oriented in the sealing assembly 100" opposite to the direction that the shield wall 104 is oriented in the sealing assembly 100. More specifically, the shield wall 104''' is oriented such that the concavity of the shield wall convolution 118 is opposite to the concavity of the axially-most outward convolutions 124, 126. In FIG. 6, for example, the shield wall convolution 118 is concave, while the first and second axially outward convolutions 124, 126 (i.e., the axially-most outward convolutions) are convex.

During assembly, the first and the second shield wall portions 114, 116 slide are positioned axially inward of the first and the second spring portions 120, 122. As illustrated in FIG. 6, the first and the second spring portions 120, 122 contact the first and the second side walls 114, 116. The shield wall 104''' and the spring 102''' are held together by compressive forces exerted thereon after assembly. The spring 102''' may compress to a greater extent than the shield wall 104'''.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine sealing assembly defining an axial direction and a radial direction, comprising:
    a first static gas turbine wall;
    a second static gas turbine wall; and
    a seal disposed between the first static gas turbine wall and the second static gas turbine wall, the seal comprising:
    a shield wall constructed from a first material, the shield wall comprising:
        a first shield wall portion extending in the axial direction;
        a second shield wall portion extending in the axial direction;
        a first crimp extending in the radial direction such that the first crimp is perpendicular to the first shield wall portion; and
        a second crimp extending in the radial direction such that the second crimp is perpendicular to the second shield wall portion; and
    a spring constructed from a second material, the spring comprising a first spring portion directly connected to a second spring portion,
    wherein the first shield wall portion is adjacent to the first spring portion and the second shield wall portion is adjacent to the second spring portion,
    and further wherein the first crimp is bent over an end of the first spring portion such that the first crimp permits axial and radially inward movement of the first spring portion but prevents radially outward movement of the first spring portion, and the second crimp is bent over an end of the second spring portion such that the second crimp permits axial and radially inward movement of the second spring portion but prevents radially outward movement of the second spring portion relative to an axial centerline axis of a gas turbine to which the sealing assembly is positioned.

2. The gas turbine sealing assembly of claim 1, wherein the first static gas turbine wall comprises a turbine shroud assembly mount and the second static gas turbine wall comprises a stator vane assembly mount.

3. The gas turbine sealing assembly of claim 1, wherein the shield wall comprises a convolution integrally connecting the first shield wall portion and the second shield wall portion.

4. The gas turbine sealing assembly of claim 1, wherein the first shield wall portion comprises a first shield wall member and the second shield wall portion comprises a second shield wall member, and further wherein a first radial wall of the first shield wall member slidingly engages a second radial wall of the second shield wall member to define a mating surface therebetween.

5. The gas turbine sealing assembly of claim 1, wherein the first shield wall portion sealingly engages the first spring portion and the second shield wall portion sealingly engages to the second spring portion, and wherein the shield wall and the spring together define a sealed chamber.

6. The gas turbine sealing assembly of claim 5, wherein the spring further comprises at least three convolutions integrally connecting the first spring portion and the second spring portion.

7. The gas turbine sealing assembly of claim 1, wherein the first spring portion and the second spring portion are each positioned relative to the axial centerline axis of the gas turbine, wherein the first spring portion is positioned axially inward from the first shield wall portion and the second spring portion is positioned axially inward from the second shield wall portion.

8. The gas turbine sealing assembly of claim 1, wherein the first material comprises a relatively greater temperature tolerance than the second material.

9. The gas turbine sealing assembly of claim 1, wherein the second material comprises a relatively greater creep resistance than the first material.

10. The gas turbine sealing assembly of claim 1, wherein the first spring portion is adjacent to and in sliding contact with the first shield wall portion, and further wherein the second spring portion is adjacent to and in sliding contact with the second shield wall portion.

11. The gas turbine sealing assembly of claim 1, wherein the first shield wall portion comprises a first shield wall member and the second shield wall portion comprises a second shield wall member, and further wherein a first radial wall of the first shield wall member slidingly engages a second radial wall of the second shield wall member to define a mating surface therebetween, and further wherein the first spring portion is adjacent to and in sliding contact with the first shield wall portion, and further wherein the second spring portion is adjacent to and in sliding contact with the second shield wall portion.

12. A gas turbine, comprising:
  a compressor;
  a combustion section;
  a turbine section comprising:
    a turbine shroud mount; and
    a stator vane mount; and
  a seal disposed between the turbine shroud mount and the stator vane mount, the seal comprising:
    a shield wall constructed from a first material, the shield wall comprising:
      a first shield wall portion extending in an axial direction of the seal;
      a second shield wall portion extending in the axial direction;
      a first crimp extending in a radial direction of the seal such that the first crimp is perpendicular to the first shield wall portion; and
      a second crimp extending in the radial direction such that the second crimp is perpendicular to the second shield wall portion; and
    a spring constructed from a second material, the spring comprising a first spring portion directly connected to a second spring portion,
    wherein the first shield wall portion is adjacent to the first spring portion and the second shield wall portion is adjacent to the second spring portion,
    and further wherein the first crimp is bent over an end of the first spring portion such that the first crimp permits axial and radially inward movement of the first spring portion but prevents radially outward movement of the first spring portion, and the second crimp is bent over an end of the second spring portion such that the second crimp permits axial and radially inward movement of the second spring portion but prevents radially outward movement of the second spring portion.

13. The gas turbine of claim 12, wherein the shield wall comprises a convolution integrally connecting the first shield wall portion and the second shield wall portion.

14. The gas turbine of claim 12, wherein the first shield wall portion comprises a first shield wall member and the second shield wall portion comprises a second shield wall member, and further wherein a first radial wall of the first shield wall member slidingly engages a second radial wall of the second shield wall member to define a mating surface therebetween.

15. The gas turbine of claim 12, wherein the first spring portion and the second spring portion are each positioned relative to an axial centerline axis of the gas turbine, wherein the first spring portion is positioned radially inward from the first shield wall portion and the second spring portion is positioned axially inward from the second shield wall portion.

16. The gas turbine of claim 12, wherein the first material comprises a relatively greater temperature tolerance than the second material and a relatively greater creep resistance than the second material.

17. The gas turbine of claim 12, wherein the first spring portion is adjacent to and in sliding contact with the first shield wall portion, and further wherein the second spring portion is adjacent to and in sliding contact with the second shield wall portion.

18. A gas turbine sealing assembly defining an axial direction and a radial direction, comprising:
  a first static gas turbine wall;
  a second static gas turbine wall; and
  a seal disposed between the first static gas turbine wall and the second static gas turbine wall, the seal comprising:
    a shield wall constructed from a first material, the shield wall comprising:
      a first shield wall portion extending in the axial direction;
      a second shield wall portion extending in the axial direction;
      a first retention boss having a first triangular cross-sectional shape, the first retention boss extending axially inward from an axially inward side of the first shield wall portion; and
      a second retention boss having a second triangular cross-sectional shape, the second retention boss extending axially inward from an axially inward side of the second shield wall portion; and
  a spring constructed from a second material, the spring comprising a first spring portion directly connected to a second spring portion;
  wherein the first shield wall portion is adjacent to the first spring portion and the second shield wall portion is adjacent to the second spring portion, wherein the first and second retention boss being configured to secure the spring to the shield wall.

19. The gas turbine sealing assembly of claim 18, wherein the first material comprises a relatively greater temperature tolerance than the second material and a relatively greater creep resistance than the second material.

* * * * *